(12) United States Patent
Atkins

(10) Patent No.: US 6,244,428 B1
(45) Date of Patent: Jun. 12, 2001

(54) CONVEYOR BELT MAINTENANCE SPECIALTY TOOLS

(76) Inventor: Ronald Atkins, 606 Park St., Willard, OH (US) 44890

(*) Notice: Subject to any disclaimer, the term of this patent is extended or adjusted under 35 U.S.C. 154(b) by 0 days.

(21) Appl. No.: 09/490,524

(22) Filed: Jan. 25, 2000

(51) Int. Cl.$^7$ ................................................ B65G 19/08
(52) U.S. Cl. ............................ 198/823; 198/841; 198/866
(58) Field of Search ................................ 198/823, 841, 198/866

(56) References Cited

U.S. PATENT DOCUMENTS

| | | |
|---|---|---|
| 3,157,272 * | 11/1964 | Bay . |
| 3,877,568 * | 4/1975 | Breiling et al. . |
| 4,007,827 * | 2/1977 | Mattos . |
| 4,324,327 * | 4/1982 | Chouteau et al. . |
| 4,513,859 * | 4/1985 | Long et al. . |
| 4,863,012 * | 9/1989 | Nord et al. . |
| 5,242,047 * | 9/1993 | Bonnet . |
| 5,316,131 * | 5/1994 | Bonnet . |
| 5,680,925 * | 10/1997 | Gallagher et al. . |
| 6,109,428 * | 8/2000 | Harm ................................ 198/841 |
| 6,193,052 * | 2/2001 | Cloud ................................ 198/841 |

* cited by examiner

Primary Examiner—Joseph E. Valenza
(74) Attorney, Agent, or Firm—John D. Gugliotta

(57) ABSTRACT

A set of specialty tools is provided that includes a belt jack trough side tool, a belt jack return side tool; a pair of return roll tools of one of two embodiments for use in conveyor belt maintenance utilizing one of two most prevalent types of return rolls, a return trainer tool, a trough roll tool, a trough frame tool, and trough trainer tool.

12 Claims, 12 Drawing Sheets

CONVEYOR BELT MAINTENANCE SPECIALTY TOOLS

BACKGROUND OF THE INVENTION

1. Field of the Invention

The present invention relates generally to maintenance of industrial conveyor belts and, more particularly, to a plurality of conveyor belt maintenance specialty tools.

2. Description of the Related Art

Conveyor belts are used in various industrial applications throughout the world. They are particularly well adapted for movement of solid material of a variety of commodities, such as coal, iron ore, stone, and the like. Taken one particular industry as an example, convey belts move coal from a stock pile and a dumper pit at a power plant to the bunker where it fed into boilers. The belts ride on a system of rollers, each fit into a frame that provide a rolling support mechanism for the belt. The top side of the belt is the feed side, and is usually in the form of a trough. The bottom side of the belt is called the return side. Belts are commercially available in widths of between 1-½feet to 7 feet and larger. The trough side runs on a series of three individual rollers, a base roller and a pair of outer rollers that are angled between 20 degrees and 35 degrees upward from the base roller, thereby forming a trough. Theses series of three rollers are placed at four foot increments, and at every 24 rollers is a trainer roll which helps guide the belt as it runs. At the return side, the return belt side is flat, and is supported by a series of single rolls placed at 8 foot increments. The return side also has trainer rolls and frames which help guide the belt.

In operation, rolls can fail and require various types of maintenance or replacement. Each roll has a bearing assembly on each end, which can be greased to prolong the life. However, in practice the time and cost of greasing each bearing assembly usually leads to the conclusion of allowing the rollers to go un-maintained until a replacement is in order. Under this method, rolls will be replaced individually, at different times, only upon the individual need.

The main problems address by the present disclosure attack the difficulties associated with replacing these failed rolls. The conveyor belt itself is under tension at all times during operation, with a counter wight at the head end of the belt to maintain this tension. In addition to having to overcome this tension force, the belt itself is heavy, but must be raised up off of the rolls in order to remove each roll. Generally, each roll has a pair of retaining nuts, but is also held down in a retaining slot.

A conventional solution to this problem has been to disassemble the roll support frame and lower the entire assembly downward from the moving belt prior to removal and replacement of the roll.

Another problem occurs from the fact that there is nothing that exists that both the rolls and frames are heavy, with no provision to allow the maintenance individual to easily support, transport, or carry. To compound this problem, seldom is a conveyor assembly positioned to allow for flat walkways, easy access, and adequate working room. Therefor, the rolls and frames generally currently need to be physically removed to a remote location for replacement or repair.

Numerous attempts have been made to correct for the foregoing problems. However, a search of the prior art did not disclose any patents that read directly on the claims of the instant invention; however, the following references were considered related:

U.S. Pat. No. 5,680,925* issued in the name of Gallagher et al;

U.S. Pat. No. 4,007,827* issued in the name of Maftos;

U.S. Pat. No. 4,863,012* issued in the name of Nord et al;

U.S. Pat. No. 4,324,327* issued in the name of Chouteau et al;

U.S. Pat. No. 5,316,131* issued in the name of Bonnett;

U.S. Pat. No. 5,242,047* issued in the name of Bonnett;

U.S. Pat. No. 4,513,859* issued in the name of Long et al.;

U.S. Pat. No. 3,877,568* issued in the name of Breiling et al.; and

U.S. Pat. No. 3,157,272* issued in the name of Bay.

Of particular interest is U.S. Pat. No. 5,680,925 issued in the name of Gallagher et al., and U.S. Pat. No. 3,157,272 issued in the name of Bay. However, the handle design, the portability of the present invention and its various elements, as well as the completely integrated nature of the present disclosure, individually and in combination, appear unanticipated by these references or the art in general. Consequently, a need has therefore been felt for an improved but less complex series of specialty tools that are particularly adapted for maintaining conventional industrial conveyor belt systems.

SUMMARY OF THE INVENTION

Therefore, it is an object of the invention to indicate a device of the type disclosed above which avoids the disadvantages inherent in the state of the art. In particular, the device is to be provide conveyor belt maintenance specialty tools that allows for ease of maintenance and repair of trough rolls, return rolls, trough frame, trough trainers, return trainers, and the like.

It is therefore an object of the present invention to provide a series of improved conveyor belt maintenance specialty tools.

It is a feature of the present invention to provide an improved, comprehensive set of conveyor belt maintenance specialty tools is provided for assistance in the maintenance, repair, and replacement of the various elements of a conveyor belt system.

Briefly described according to the preferred embodiment of the present invention, a set of specialty tools is provided that includes a belt jack trough side tool, a belt jack return side tool; a pair of return roll tools of one of two embodiments for use in conveyor belt maintenance utilizing one of two most prevalent types of return rolls, a return trainer tool, a trough roll tool, a trough frame tool, and trough trainer tool.

An advantage of the present invention is that an improved belt jack trough side tool is provided. Particularly, such a belt jack trough side tool enables the belt to be raised from the roller in-situ in a manner adaptable to belts of various widths and troughs of various angles.

Another advantages of the present invention is that an improved belt jack return side tool is provided. Particularly, such a belt jack return side tool enables the belt to be raised from the roller in-situ in a manner adaptable to belts of various widths.

Another advantages of the present invention is that an improved pair of return roll tools are provided for use with any one of two of two most prevalent types of return rolls, thereby allowing return rolls to be carried to and from the site locations.

Another advantages of the present invention is that an improved return trainer tool is provided. Particularly, such a tool is provided that enables the return trainer roll and attached frame to be removed a manner adaptable to belts of various widths and allow the frame to be carried to and from the maintenance locations.

Another advantages of the present invention is that an improved trough roll tool is provided, thereby allowing trough rolls of various sizes to be easily carried to and from the site locations.

Another advantages of the present invention is that an improved trough frame tool is provided, thereby providing an efficient way to carry a roller frame to the location, as well as remove a damaged frame from the job site.

And finally, another advantages of the present invention is that an improved trough trainer tool is provided, thereby providing an efficient way to carry a trainer frame to the location, as well as remove a damaged frame from the job site.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

According to the present invention, a comprehensive set of conveyor belt maintenance specialty tools is provided for assistance in the maintenance, repair, and replacement of the various elements of a conveyor belt system. Such a set of specialty tools includes a belt jack trough side tool, a belt jack return side tool; a pair of return roll tools of one of two embodiments for use in conveyor belt maintenance utilizing one of two most prevalent types of return rolls, a return trainer tool, a trough roll tool, a trough frame tool, and trough trainer tool.

Figure 1:
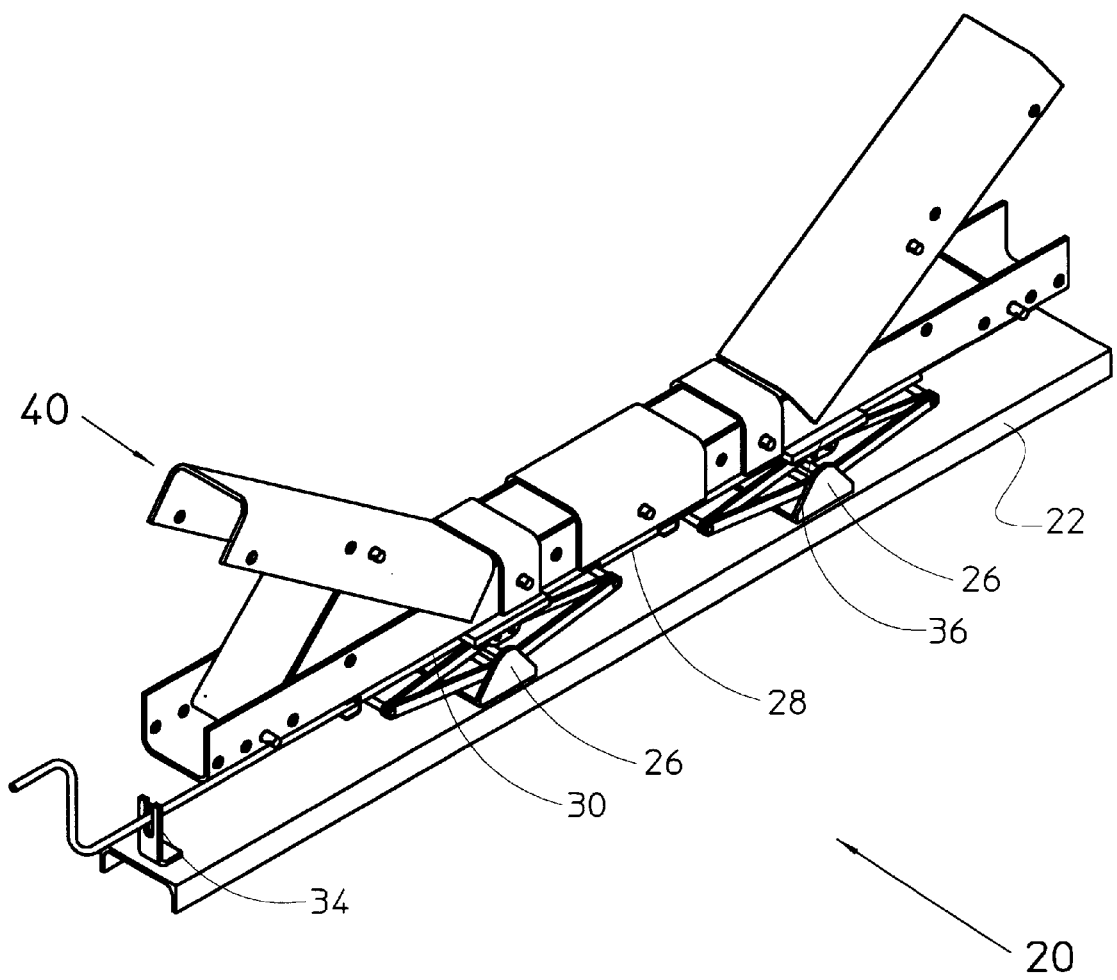
FIG. 1 is a partial exploded perspective view of a belt jack trough side tool for use in conveyor belt maintenance according to the preferred embodiment of the present invention.
Figure 2:
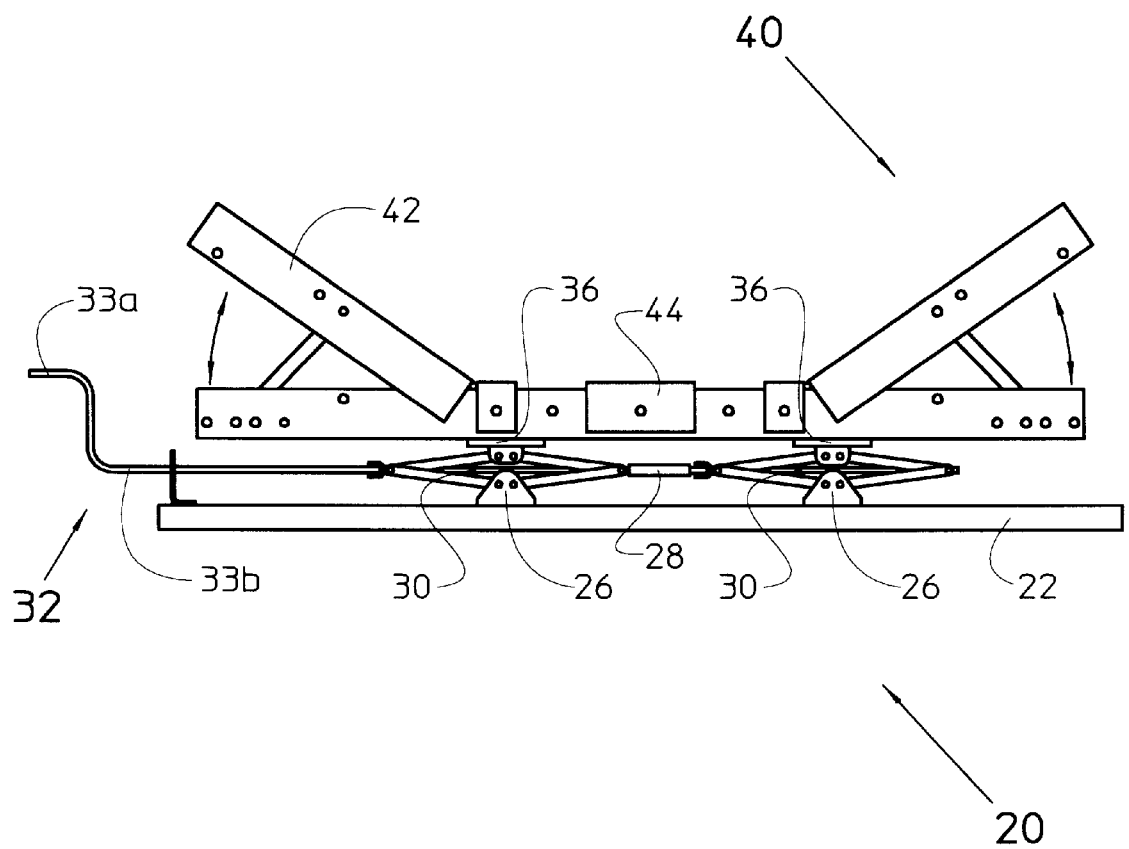
FIG. 2 is a side elevational view thereof.

Referring now to FIGS. 1–2, a belt jack trough side tool 20 for use in conveyor belt maintenance is shown according to the preferred embodiment of the present invention. Designed for use in lifting the belt from the trough side of the conveyor, thereby providing access to the trough side rollers, a horizontal support base 22 is provided of sufficient linear length to traverse the width of the support frame of a conventional conveyor system. The support base 22 provides a rigid platform upon which a pair of scissor jacks 26 are mounted in parallel along the linear centerline of the base 22. Each scissor jack 26 is in physical communication with the other scissor jack 26 through a mechanical coupling 28 that synchronizes the lift action of both jacks 26 such that as the center lift screw 30 of either jack is rotated the center lift screw of the other attached jack is equally and simultaneously rotated accordingly. A jack lift means 32 for providing the initial rotation for causing the jacks to lift or settle is in physical communication with one such jack 26. It is envisioned that a number of different conventional lift means can accomplish the same effect, whether powered or manual. For purposes of disclosing the best mode, and not by way of limitation, herein shown the jack lift means 32 comprises a conventional brace 33A terminating an extension access driving rod 33B. In this configuration, a driving rod guide 34, affixed to the base 22, can be utilized to assist in guiding the driving rod 33B when rotating the brace 33A to lift or settle the jacks 26. Mounted to the top of each jack 30 is a support plate 36 which affixes a belt lift mechanism 40 in physical communication with the jacks 30.

The belt lift mechanism 40, when the jacks 30 are lifted, are used to lift the trough belt of a conventional conveyor system up away from the trough rollers to allow for maintenance access to the trough rollers. In this manner repair crews can use the belt jack to repair the belts above the rollers by creating a flat surface to implement repairs of patches, tears and the like in vulcanized belts. Because the feed portions of a conventional conveyor is usually cupped unto the form of a trough for providing greater carrying capacity, the belt lift mechanism 40 includes an adjustable trough sidewall supports 42 that are pivotally affixed to the trough bottom support 44, thereby allowing the belt lift mechanism 40 to be adapted to the particular configuration of the trough belt. Generally known are conventionally available tough belts that include either a 20 degree incline, or a 35 degree incline. Retaining holes in the bottom support 44 allow the sidewall supports 42 to be locked flat, or, alternately, locked upright at predetermined angles to support the appropriate trough configuration. Adjustment holes in the bottom support 44 allo the sidewall supports 42 to accommodate various sized belts in this same fashion.

Figure 3:
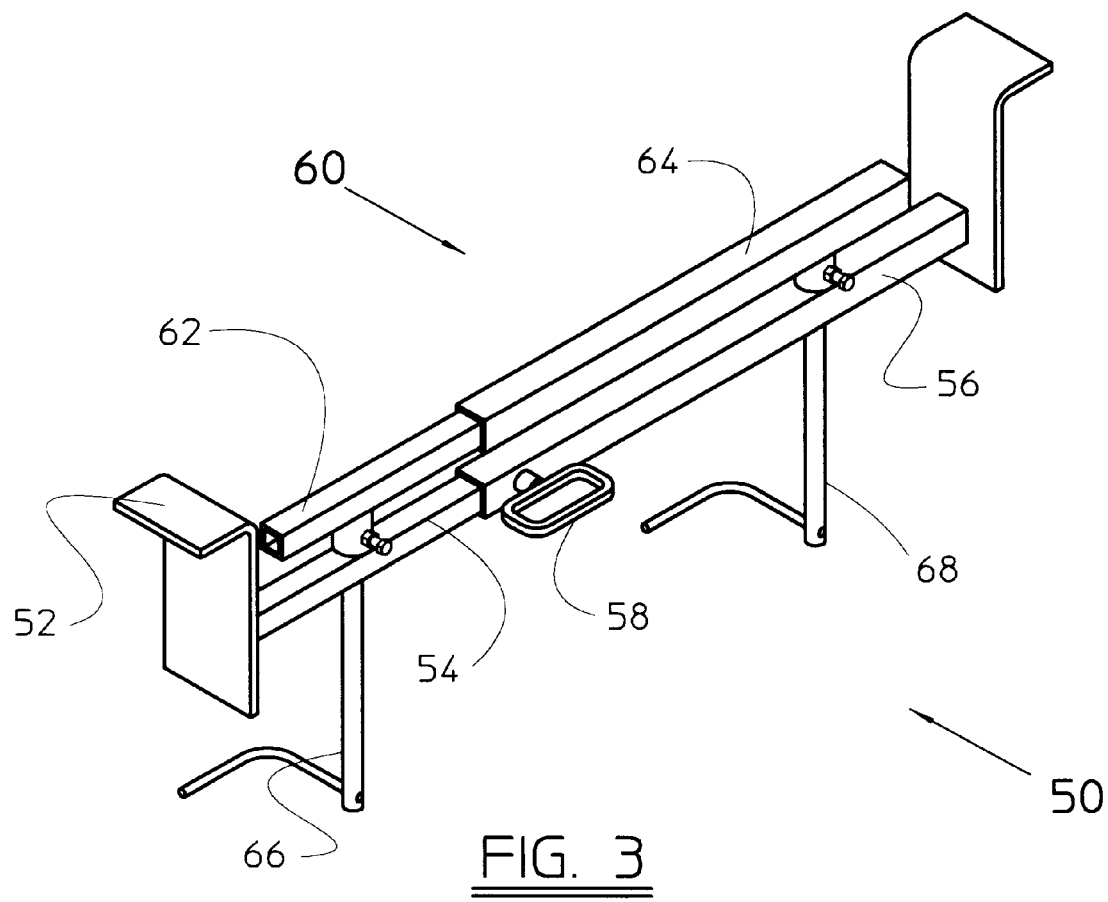
FIG. 3 is a perspective view of a belt jack return side tool for use in conveyor belt maintenance according to the preferred embodiment of the present invention.
Figure 4:
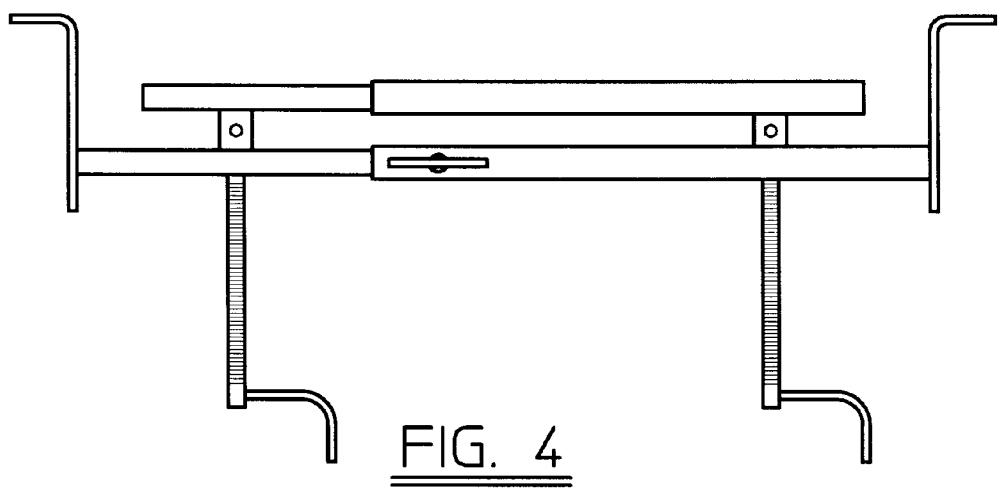
FIG. 4 is a side elevational view thereof

Referring now to FIGS. 3–4, a belt jack return side tool 50 for use in conveyor belt maintenance is shown according to the preferred embodiment of the present invention. Designed for use in removing and replacing belt rollers, the belt jack return side tool functions as a specialty jack that raisins a belt off of its supporting roller in a temporary fashion. To accomplish this, a pair of laterally opposed interior rail clamps 52 are mounted parallel to each other. One interior rail clamp 52 is mounted to the terminal end of an inner horizontal brace 54. The opposed interior rail clamp 52 is mounted to the terminal end of an outer horizontal brace 56. Both horizontal braces 54, 56, are linearly elongated, with the inner horizontal brace 54 fitting telescopingly at its proximal end into, and is received by the proximal end of the outer horizontal brace 56 in a telescopingly adjustable fashion. In this manner, the opposed interior rail clamps 52 can be adjusted to various distances apart. In order to fix this adjustable distance, a horizontal brace lock 58 is provided to physically impinge between the outer brace 56 and inner brace 54 in a releasable fashion.

Further, a horizontal belt support 60 is provided comprising a horizontally elongated inner horizontal belt support 62 fitting telescopingly at its proximal end into, and is received by the proximal end of an outer horizontal belt support 64 a telescoping fashion. The inner horizontal belt support 62 is connected to the inner horizontal brace 54 by an inner belt support vertical adjustment 66. Similarly, the outer horizontal belt support 64 is connected to the outer horizontal brace 56 by an outer belt support vertical adjustment 68. The inner vertical adjustment 66 and outer vertical adjustment 68 allow the horizontal belt support 60 to be linearly, vertically extended upward to lift the return belt from the conveyor off of its related return roller. In this manner, the opposed interior rail clamps 52 can be adjusted to various distances apart. In order to fix this adjustable distance, a horizontal brace lock 58 is provided to physically impinge between the outer brace 56 and inner brace 54 in a releasable fashion. It is envisioned that a number of different conventional lift means can accomplish the same effect, whether powered or manual. For purposes of disclosing the best mode, and not by way of limitation, herein shown the vertical adjustments 66, 68 are each comprised of independent screw jack mechanisms.

Figure 5:
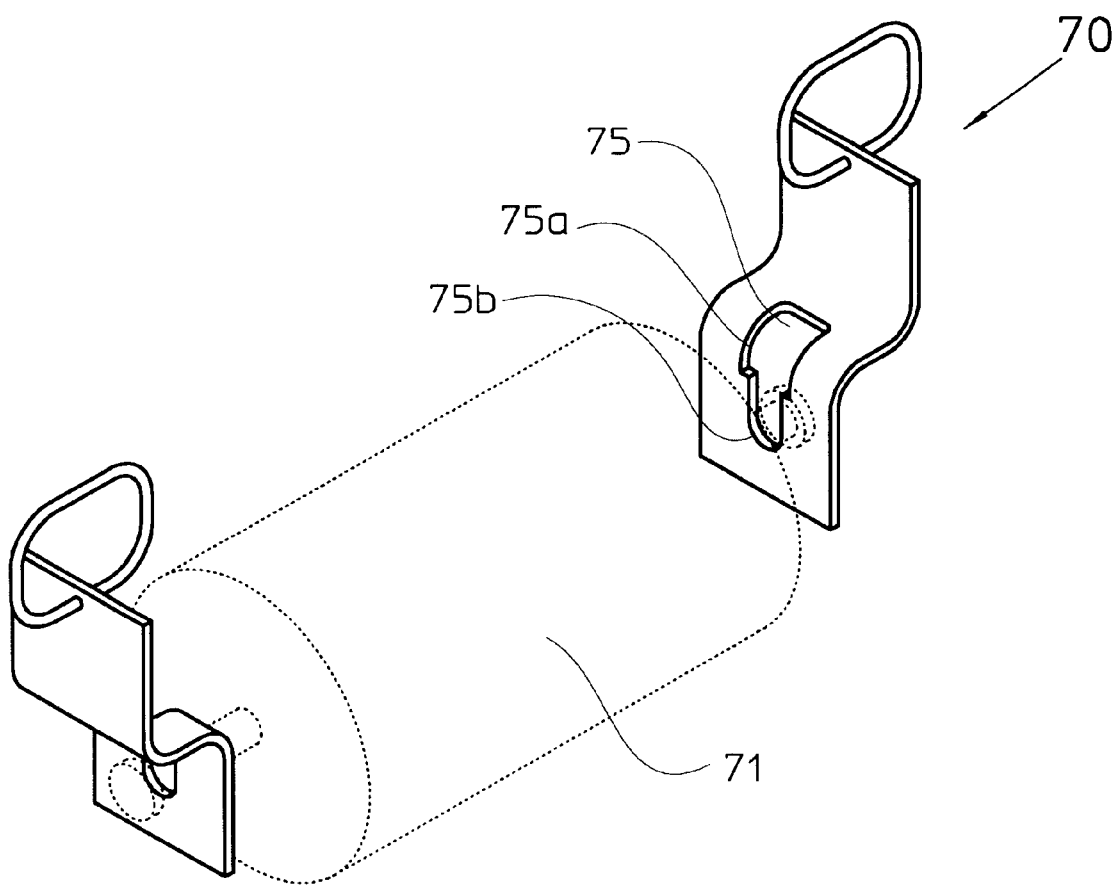
FIG. 5 is a perspective view of a first embodiment of a pair of return roll tools for use in conveyor belt maintenance according to the preferred embodiment of the present invention.
Figure 6:
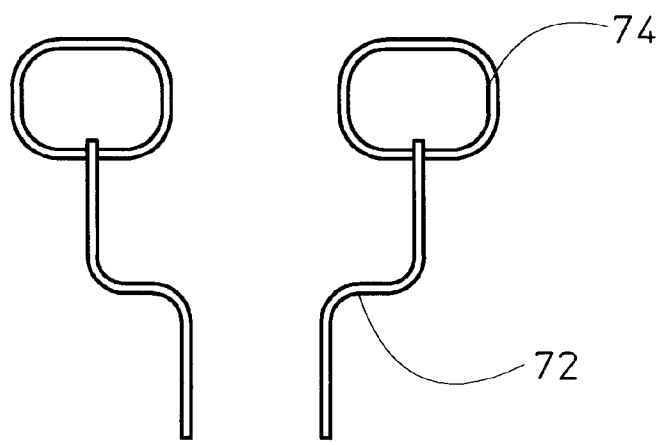
FIG. 6 is a side elevational view thereof.

Referring now to FIGS. 5–6, a first embodiment of a pair of return roll support tools 70 for use in conveyor belt maintenance is shown according to the present invention. These tools, when used in pairs, allow standard conveyor return rolls 71 to be carried to and from the maintenance location; or, alternately, to allow the carrying of cleaning rollers to the site location. Each support tool 70 includes a cantilever plate support frame 72 having a handle 74 affixed perpendicularly thereto. The support frame 72 forms an axle receiving orifice 75 having an expanded portion 75*a* for allowing passage of the axle and retaining nut of a return roller 71 angled into a contracted portion 75*b* for impinging firmly against the axle and retaining nut of a return roller 71.

Figure 7:
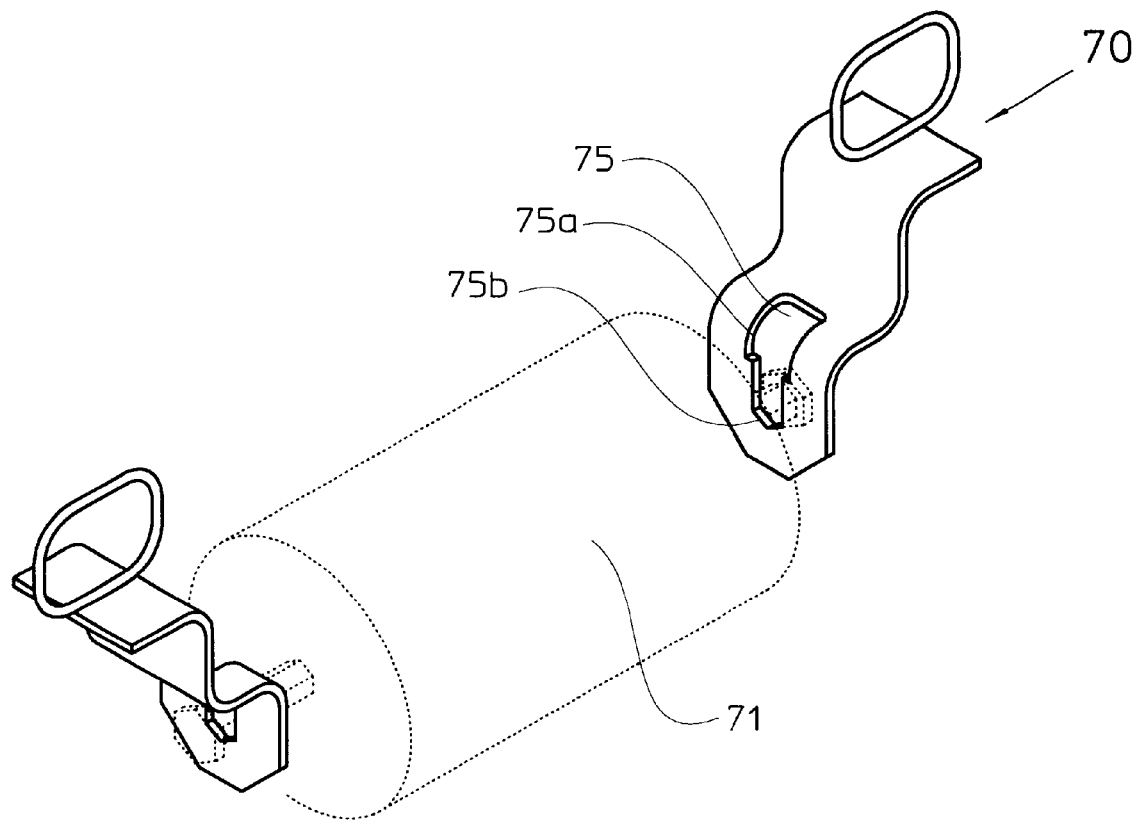
FIG. 7 is a perspective view of a second embodiment of a pair of return roll tools for use in conveyor belt maintenance according to the preferred embodiment of the present invention.
Figure 8:
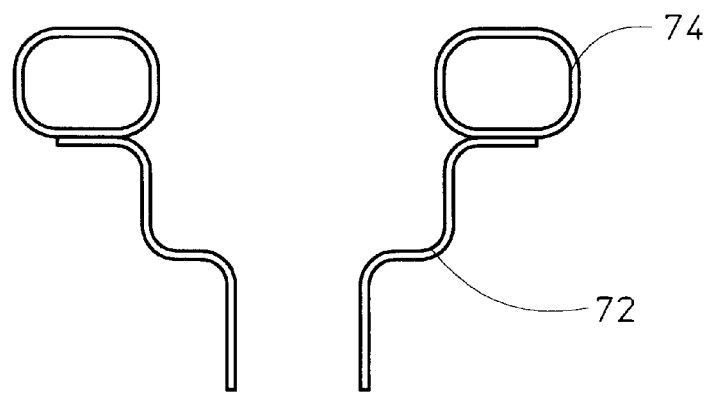
FIG. 8 is a side elevational view thereof.

Referring now to FIGS. 7–8, a second embodiment of a pair of return roll tools 70 for use in conveyor belt maintenance is shown according to the present invention. This second embodiment incorporates the same structural elements as the first embodiment of FIGS. 5–6. However, the contracted portion 75*b* of the receiving orifice 75 is formed to terminate in an angled nut receiving recess shaped to conform to a conventional hexagonal nut.

Figure 9:
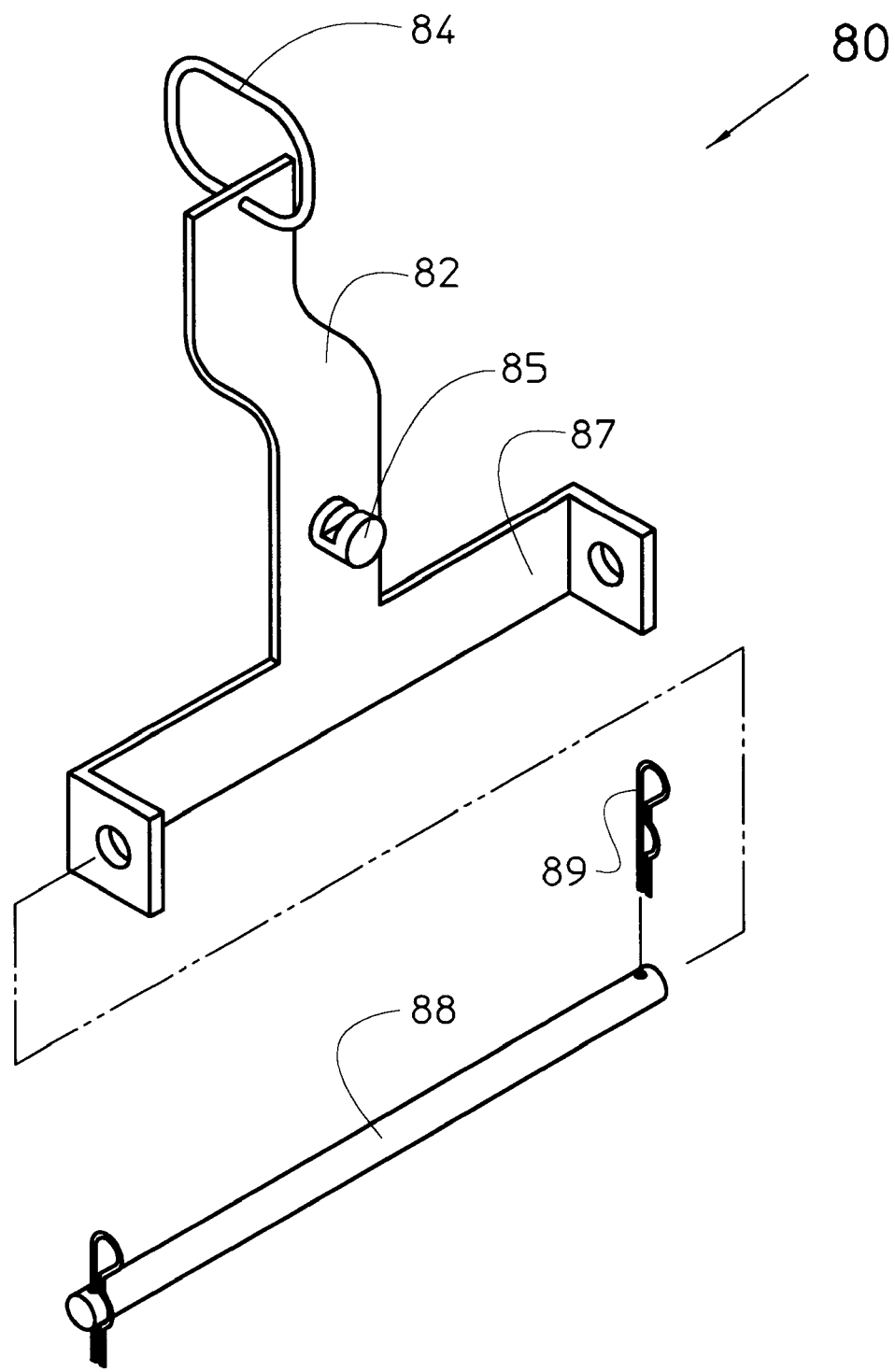
FIG. 9 is an exploded perspective view of a return trainer tool for use in conveyor belt maintenance according to the preferred embodiment of the present invention.
Figure 10:
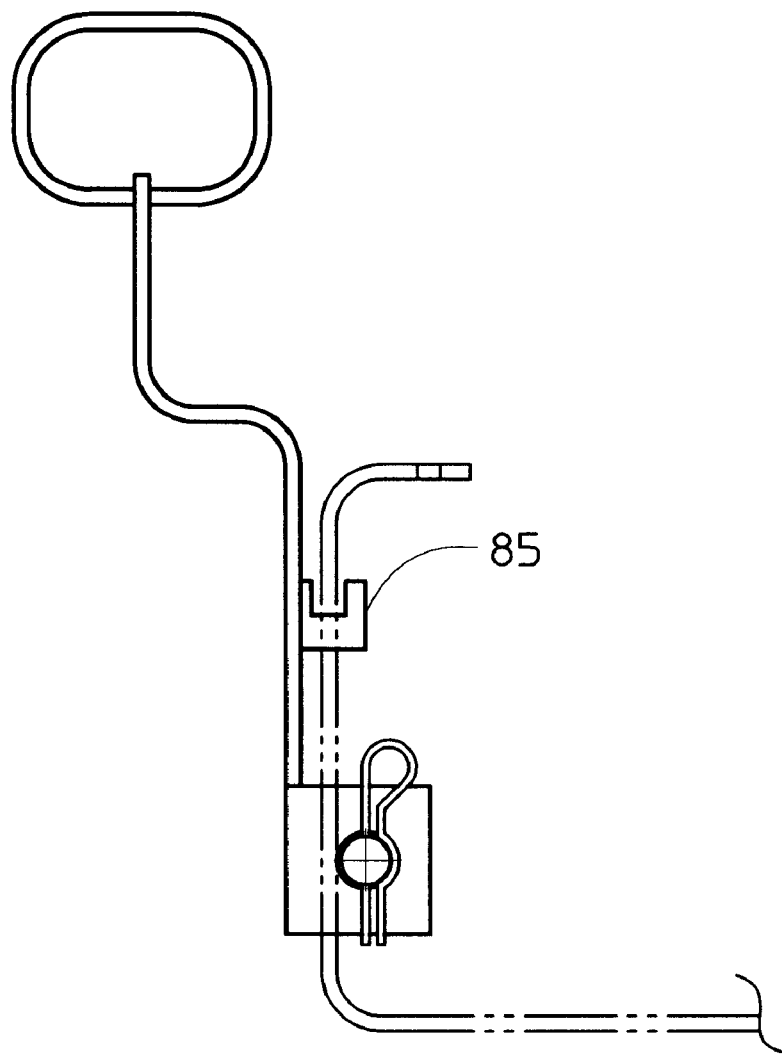
FIG. 10 is a side elevational view thereof.

Referring now to FIGS. 9–10, a return trainer tool 80 for use in conveyor belt maintenance is shown according to the preferred embodiment of the present invention. These tools, when used in pairs, allow standard conveyor return trainer rolls 80 to be carried to and from the maintenance location when the roll is housed within its support frame. Each support tool 80 includes a cantilever plate support frame 82 having a handle 84 affixed perpendicularly thereto. The support frame 82 supports a support peg 85 that inserts within a receiving orifice located on trainer roll frames. A recess on top of the support peg 85 is used to align the peg within the frame, such that when the tool is pulled up the peg 85 is locked into place. A horizontal retaining frame 87, extending laterally outward supports a retaining bar 88 further functions to lock around the plate metal frame of the trainer roll frame. A pair of removable retaining pins 89 prevent the retaining bar from releasing from the frame 87 in an unexpected fashion.

Figure 11:
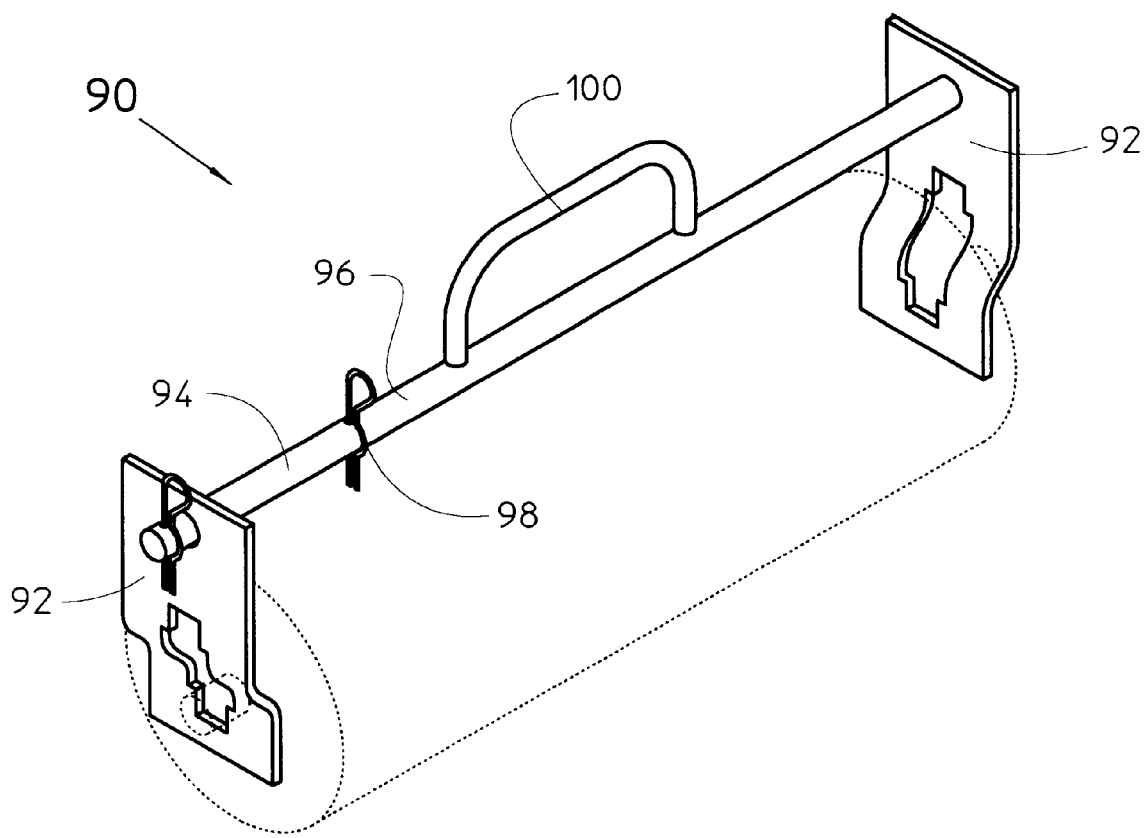
FIG. 11 is a perspective view of a trough roll tool for use in conveyor belt maintenance according to the preferred embodiment of the present invention.
Figure 12:
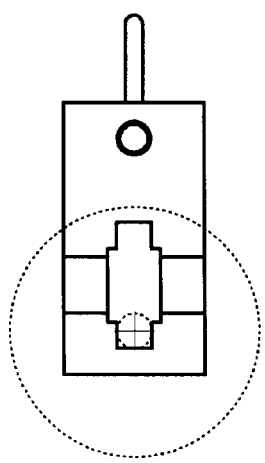
FIG. 12 is a front elevational view thereof.

Referring now to FIGS. 11–12, a trough roll tool 90 for use in conveyor belt maintenance is shown according to the preferred embodiment of the present invention. Use of this tool 90 allows an individual to easily carry an individual trough roll to and from remote locations. To accomplish this, a pair of laterally opposed support plates 92 are mounted parallel to each other. Each support plate 92 is similar in design to those used in the return roll tools 70 above. One support plate 92 is mounted to the terminal end of an inner support rod 94. The opposed support plate 92 is mounted to the terminal end of an outer support rod 96. Both support rods 94, 96 are linearly elongated, with the inner support rod 94 fitting telescopingly at its proximal end into, and is received by the proximal end of the outer support rod 96 in a telescopingly adjustable fashion. In this manner, the opposed support plates 92 can be adjusted to various distances apart. In order to fix this adjustable distance, a horizontal brace lock 98 is provided to physically impinge between the outer rod 96 and inner rod 94 in a releasable fashion. Further, a handle 100 is affixed to the outer support rod 96 in order to form a easily manipulated carrying surface.

Figure 13:
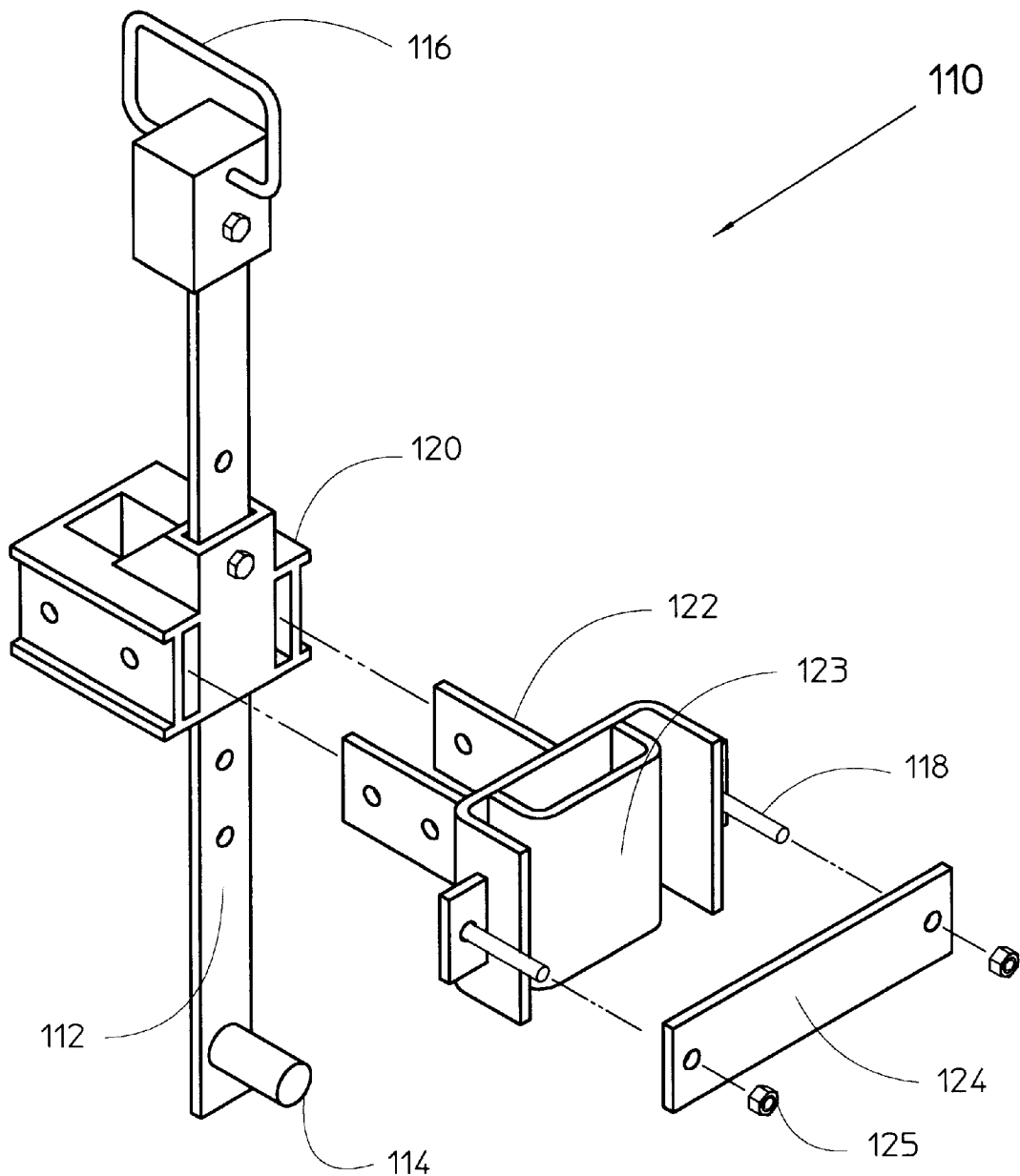
FIG. 13 is an exploded perspective view of a trough frame tool for use in conveyor belt maintenance according to the preferred embodiment of the present invention.
Figure 14:
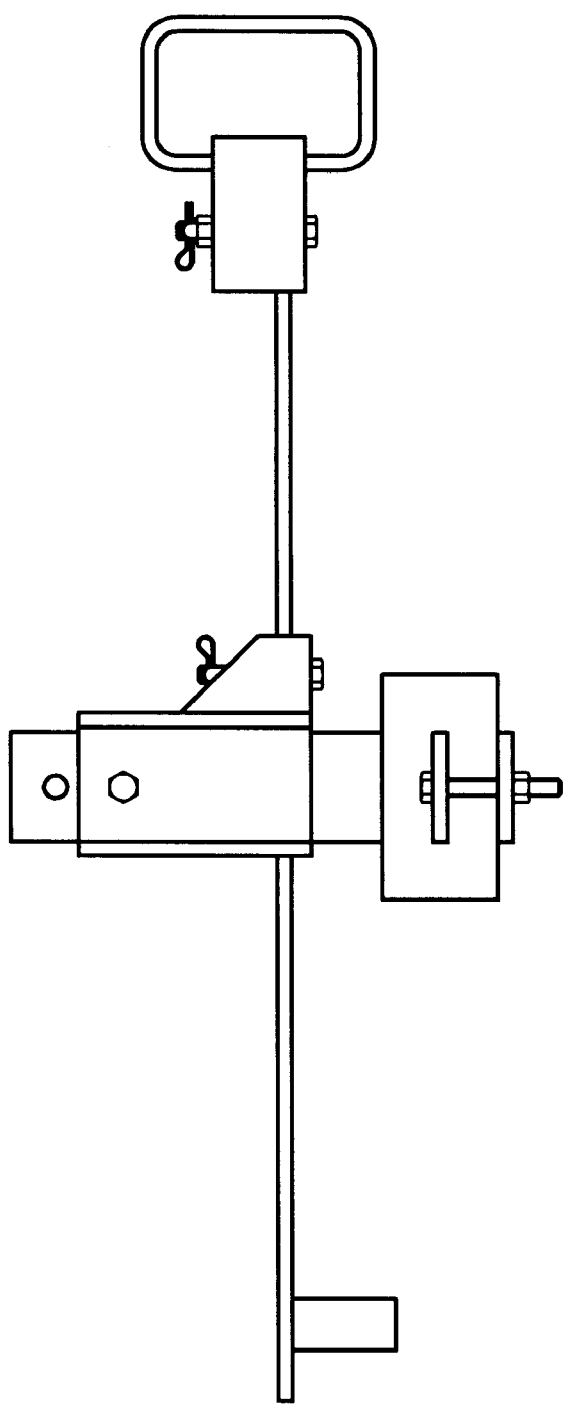
FIG. 14 is a side elevational view thereof.

Referring now to FIGS. 13–14, a trough frame tool 110 for use in conveyor belt maintenance is shown according to the preferred embodiment of the present invention. The tool 110 is designed to affix to and carry a trough roller frame with rolls already in place, if necessary. As such, the tool 110 utilizes a vertical lift member 112 having a lower supporting protrusion 114, functioning as the main lifting element of the tool, opposite an upper handle 116. Along the elongated vertical centerline of the lift member 112 is a vertically adjustable sideframe clamping member 118. The sideframe clamping member 118 is designed both to releasably attached to the upper vertical sideframe of a trough frame element (not shown), as well as vertically and horizontally adjust and fix relative to the lift member 112, thereby providing a convenient gripping and lifting element for the trough frame or combined trough frame and roller assembly. A clamp receiving and adjusting frame 120 provides a means for adjusting the location of the clamping member 118 vertically along the lift member 112. Also, the adjusting frame 120 receives and connects to a vertical clamp element 122, that in turn mounts to the side vertical frame member of a trough frame by impinging it between the front clamp face 123 and a retaining bar 124 by conventional threaded fasteners 125.

Figure 15:
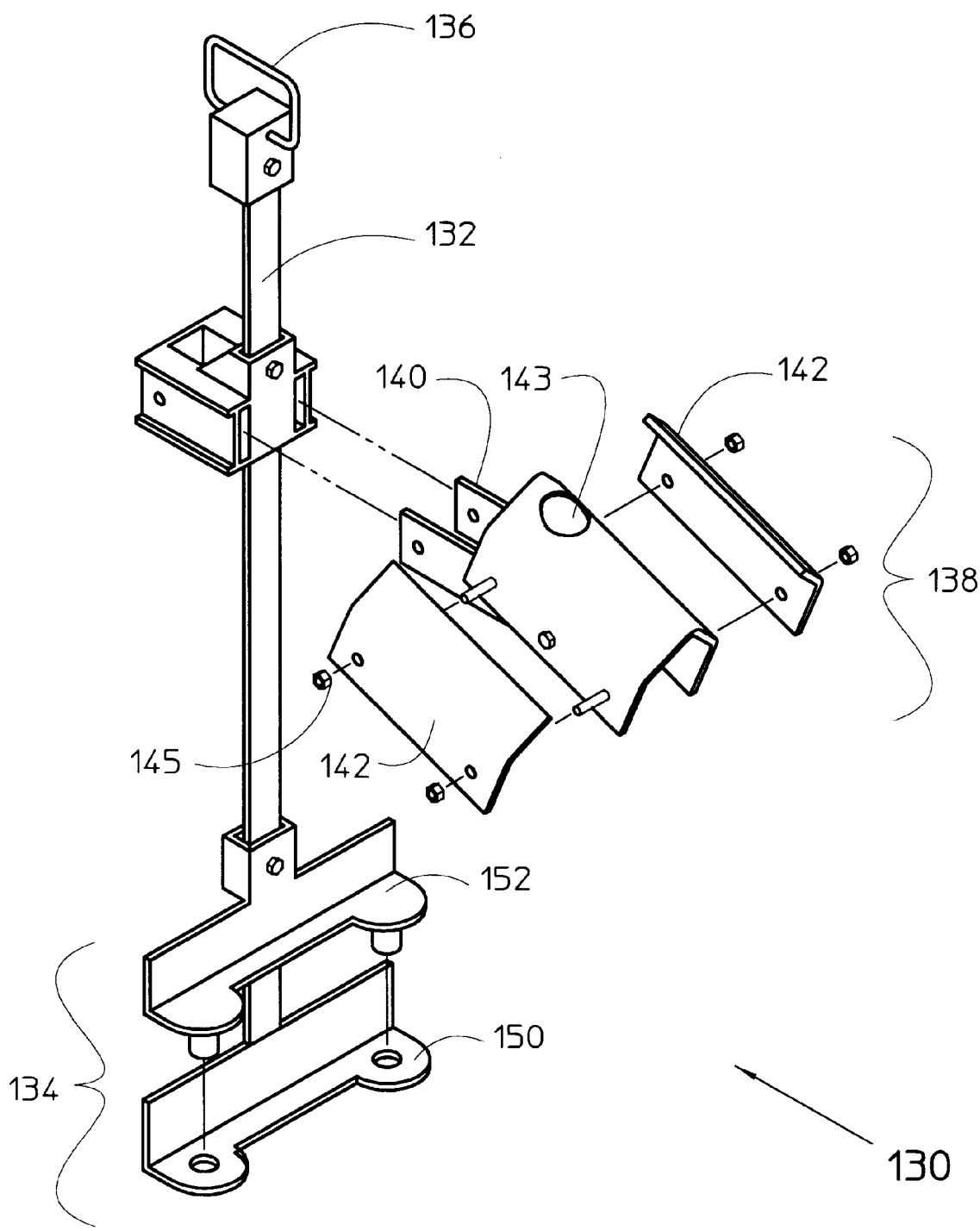
FIG. 15 is a partial exploded perspective view of a trough trainer tool for use in conveyor belt maintenance according to the preferred embodiment of the present invention.
Figure 16:
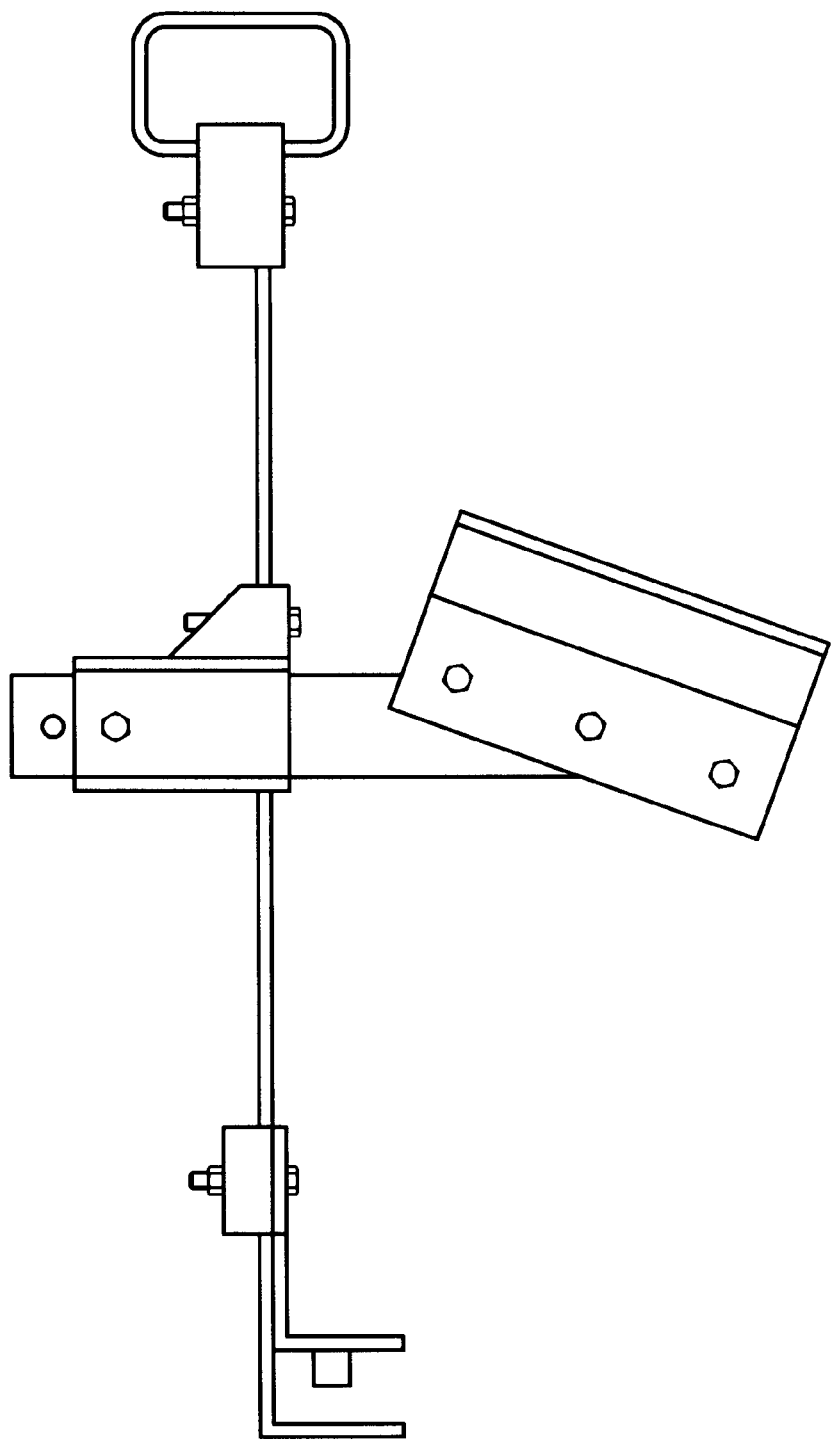
FIG. 16 is a side elevational view thereof.

And finally, referring now to FIGS. 15–16, a trough trainer tool 130 for use in conveyor belt maintenance is shown according to the preferred embodiment of the present invention. The tool 130 is designed to affix to and carry a trough trainer and roller frame with rolls already in place, if necessary. As such, the tool 130 utilizes a vertical lift member 132 having a lower supporting assembly 134 opposite an upper handle 136. Along the elongated vertical centerline of the lift member 132 is a vertically adjustable trainer assembly clamping member 138. The trainer clamping member 138 is designed both to releasably attached to and support an angularly disposed trough trainer frame element (not shown), as well as vertically and horizontally adjust and fix relative to the lift member 132, thereby providing a convenient gripping and lifting element for the trough trainer frame or combined trough trainer frame and roller and roller frame assembly. An angularly disposed clamp receiving and trainer frame support 140 provides a means for adjusting the location of the clamping member 138 into the angular channel that forms the trainer frame (not shown). Also, the frame support 140 receives and connects to a pair of angular clamp elements 142, that in turn mounts to the outside of a trough trainer frame by impinging it between the front clamp face 143 and a clamp element 142 by conventional threaded fasteners 145.

Finally, the lower supporting assembly 134 is formed of a fixed first support member 150, rigidly affixed to the vertical lift member 132, and an aligned and slidable second support member 152, slidably disposed along the linear length of the vertical lift member 132. In this manner, the frame base of a trough trainer frame can be mechanically impinged between said support members 150, 152 respectively.

As designed, a device embodying the teachings of the present invention is easily applied. The foregoing description is included to illustrate the operation of the preferred embodiment and is not meant to limit the scope of the invention. As one can envision, an individual skilled in the relevant art, in conjunction with the present teachings, would be capable of incorporating many minor modifications that are anticipated within this disclosure. Therefore, the scope of the invention is to be broadly limited only by the following claims.

What is claimed is:

1. A set of conveyor belt maintenance specialty tools for provided assistance in the maintenance, repair, and replacement of a conveyor belt system, said set of specialty tools comprising:
    a belt jack trough side tool;
    a belt jack return side tool;
    a pair of return roll tools;
    a return trainer tool;
    a trough roll tool;
    a trough frame tool; and
    a trough trainer tool.

2. The set of conveyor belt maintenance specialty tools of claim 1, wherein said belt jack trough side tool comprises:
    a horizontal support base of sufficient linear length to traverse the width of the support frame of a conventional conveyor system;
    a pair of scissor jacks are mounted in parallel along a linear centerline of said base, each scissor jack being in physical communication with the other scissor jack through a mechanical coupling, thereby synchronizing the lift action of both jacks such that as a enter lift screw of either jack is rotated the center lift screw of the other attached jack is equally and simultaneously rotated;
    jack lift means for providing rotation for causing the jacks to lift or settle, said jack lift means being in physical communication with one such jack;
    a support plate mounted to the top of each jack; and
    a belt lift mechanism physical communication with said jacks by attachment to said support plates; wherein when the jacks are lifted, said belt lift mechanism lifts the trough belt of a conventional conveyor system up away from trough rollers to allow for maintenance access to the trough rollers.

3. The set of conveyor belt maintenance specialty tools of claim 2, wherein said belt lift mechanism further comprises an adjustable trough sidewall supports pivotally affixed to a trough bottom support such that said belt lift mechanism can be adapted to various trough belt sidewall angles.

4. The set of conveyor belt maintenance specialty tools of claim 2, wherein said lift means comprises a brace terminating an extension access driving rod.

5. The set of conveyor belt maintenance specialty tools of claim 1, wherein said belt jack return side tool comprises:
    a pair of laterally opposed interior rail clamps mounted parallel to each other;
    an outer horizontal brace mounted to a terminal end of one said interior rail clamp
    an inner horizontal brace mounted to a terminal end of one said interior rail clamp, said inner horizontal brace fitting telescopingly at a proximal end into, and is received by a proximal end of said outer horizontal brace 6 in a telescopingly adjustable fashion; and
    a horizontal brace lock to physically impinge said belt jack return side tool between said outer brace and said inner brace in a releasable fashion.

6. The set of conveyor belt maintenance specialty tools of claim 5, wherein said belt jack return side tool further comprises:
    a horizontal belt support comprising a horizontally elongated inner horizontal belt support fitting telescopingly at a proximal end into, and is received by the proximal end of an outer horizontal belt support; and
    an inner belt support vertical adjustment for connecting said inner horizontal belt support to said inner horizontal brace;
    an outer belt support vertical adjustment means for connecting said outer horizontal belt support to said outer horizontal brace; wherein said inner vertical adjustment and said outer vertical adjustment allow said horizontal belt support to be linearly, vertically extended upward to lift the return belt from the conveyor off of its related return roller.

7. The set of conveyor belt maintenance specialty tools of claim 1, wherein said return roll support tools each comprise:
    a cantilever plate support frame;
    a handle affixed perpendicularly to said plate support frame; and
    an axle receiving orifice formed by said support frame, said orifice having an expanded portion for allowing passage of the axle and retaining nut of a return roller, said orifice further having a contracted portion for impinging firmly against the axle and retaining nut of a return roller.

8. The set of conveyor belt maintenance specialty tools of claim 1, wherein said a return trainer tool comprises:
    a cantilever plate support frame having a handle affixed perpendicularly thereto, said support frame for supporting a support peg that inserts within a receiving orifice located on trainer roll frames;
    a recess on top of said support peg for aligning said peg within the frame, such that when the tool is pulled up the peg is locked into place;
    a horizontal retaining frame extending laterally outward
    a retaining bar supported by said retaining frame for locking around the plate metal frame of the trainer roll frame; and
    a pair of removable retaining pins for preventing the retaining bar from releasing from the frame.

9. The set of conveyor belt maintenance specialty tools of claim 1, wherein said trough roll tool comprising:

an outer support rod, said outer support rod being linearly elongated;

an inner support rod, said inner support rod being linearly elongated and fitting telescopingly at its proximal end into, and is received by a proximal end of said outer support rod in a telescopingly adjustable fashion;

a pair of laterally opposed support plates mounted parallel to each other to the terminal end of said inner support rod and opposed support plate mounted to the terminal end of said outer support rod;

a horizontal brace lock provided to physically impinge between said outer rod and said inner rod in a releasable fashion; and a handle affixed to said outer support rod to form a easily manipulated carrying surface.

10. The set of conveyor belt maintenance specialty tools of claim 1, wherein said trough frame tool comprises:

a vertical lift member being vertically elongated and having a lower supporting protrusion functioning as the main lifting element;

an upper handle affixed to said vertical lift member opposite said lower supporting protrusion;

a vertically adjustable sideframe clamping member, said sideframe clamping member for releasably attaching to an upper vertical sideframe of a trough frame element; and a clamp receiving and adjusting frame for providing means for adjusting the location of the clamping member vertically along said lift member.

11. The set of conveyor belt maintenance specialty tools of claim 1, wherein said trough trainer tool comprises:

a vertical lift member having a lower supporting assembly opposite an upper handle;

a vertically adjustable trainer assembly clamping member mounted along the elongated vertical centerline of said lift member;

a trainer clamping member for releasably attaching to and support an angularly disposed trough trainer frame element; and an angularly disposed clamp receiving and trainer frame support for providing means for adjusting the location of the clamping member into the angular channel that forms the trainer frame.

12. The set of conveyor belt maintenance specialty tools of claim 1, wherein said trough trainer tool comprises:

a lower supporting assembly formed of a fixed first support member rigidly affixed to a vertical lift member; and an aligned and slidable second support member slidably disposed along the linear length of the vertical lift member for mechanically impinging a frame base of a trough trainer frame.

* * * * *